United States Patent [19]

Klaeysen et al.

[11] 4,080,134
[45] Mar. 21, 1978

[54] APPARATUS FOR PELLETIZING PLASTIC MATERIAL

[75] Inventors: Adrian O. Klaeysen; Lester A. Lehman, both of Palmyra; Ivan R. Witty, Williamson, all of N.Y.

[73] Assignee: Mobil Oil Corporation, New York, N.Y.

[21] Appl. No.: 754,376

[22] Filed: Dec. 27, 1976

Related U.S. Application Data

[62] Division of Ser. No. 615,948, Sep. 23, 1975, Pat. No. 4,000,232.

[51] Int. Cl.² ............................................. B29F 3/012
[52] U.S. Cl. .................................. 425/143; 425/310; 425/317; 425/DIG. 230
[58] Field of Search ..... 425/143, 310, 317, DIG. 230, 425/135

[56] References Cited

U.S. PATENT DOCUMENTS

| 2,651,269 | 9/1953 | French ....................... 425/DIG. 230 |
| 2,700,940 | 2/1955 | Johnson ......................... 425/310 X |
| 2,887,718 | 5/1959 | Curran et al. .............. 425/DIG. 230 |
| 3,177,819 | 4/1965 | Lawrence et al. .......... 425/DIG. 230 |
| 3,217,665 | 11/1965 | Lawrence et al. ......... 425/DIG. 230 |
| 3,932,091 | 1/1976 | Vink ........................... 425/DIG. 230 |

Primary Examiner—Robert L. Spicer, Jr.
Attorney, Agent, or Firm—Charles A. Huggett; James F. Powers, Jr.

[57] ABSTRACT

The specific embodiments provide for pelletizing plastic material in a system including a device for compacting the plastic material through a plurality of orifices. Air is vented from the compacting device by a conduit, and a pressurized gaseous stream is supplied in the conduit in a direction away from the compacting device. A signal is generated indicative of the temperature of a portion of the compacting device, and the flow rate of gaseous stream is controlled in response to the signal.

14 Claims, 5 Drawing Figures

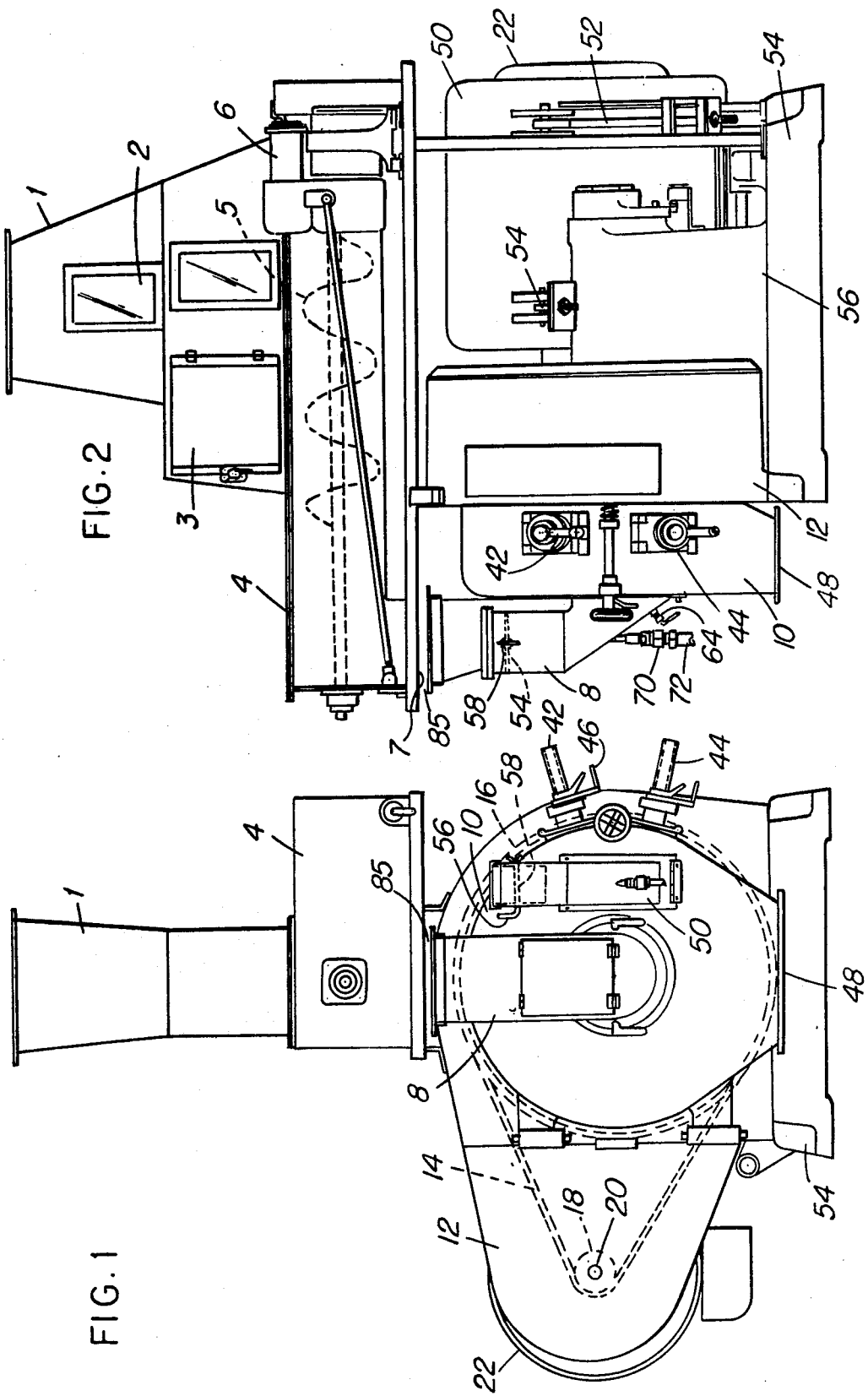

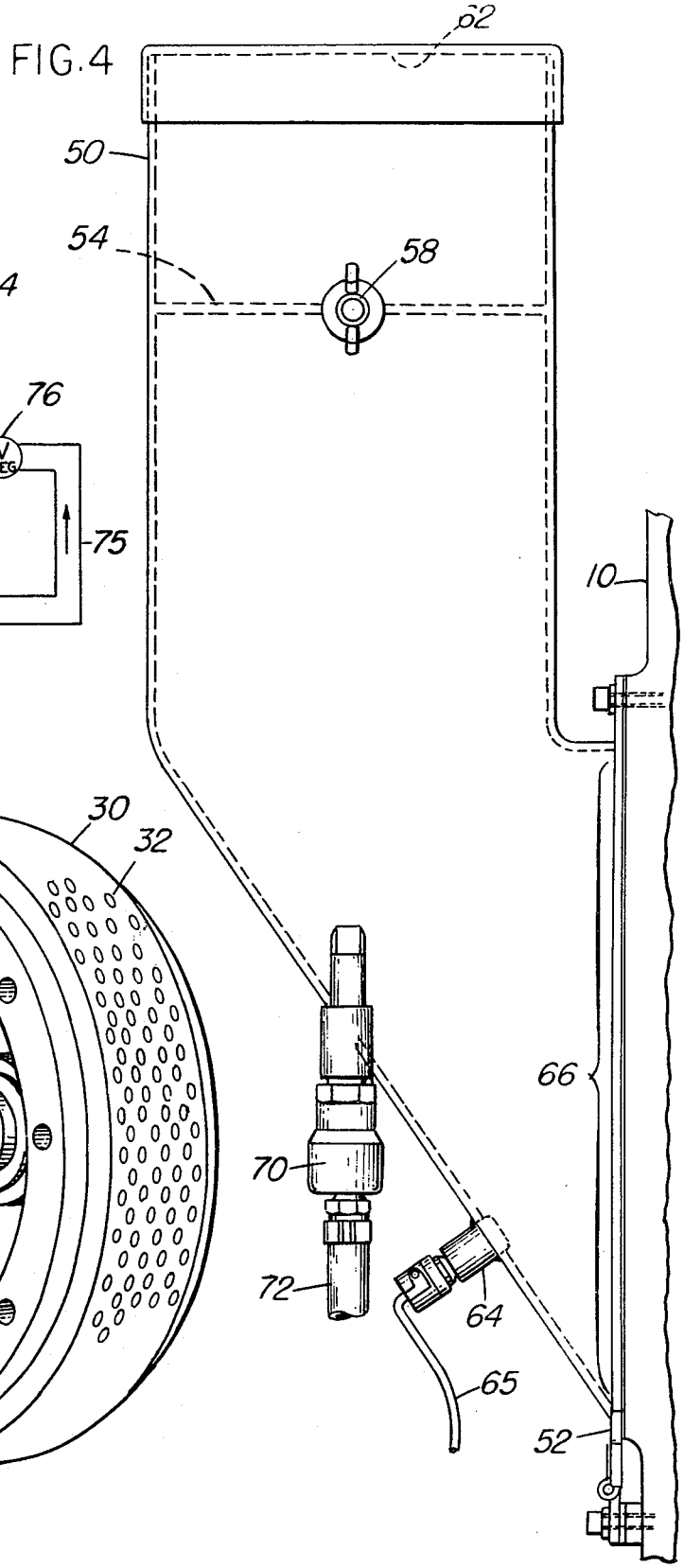
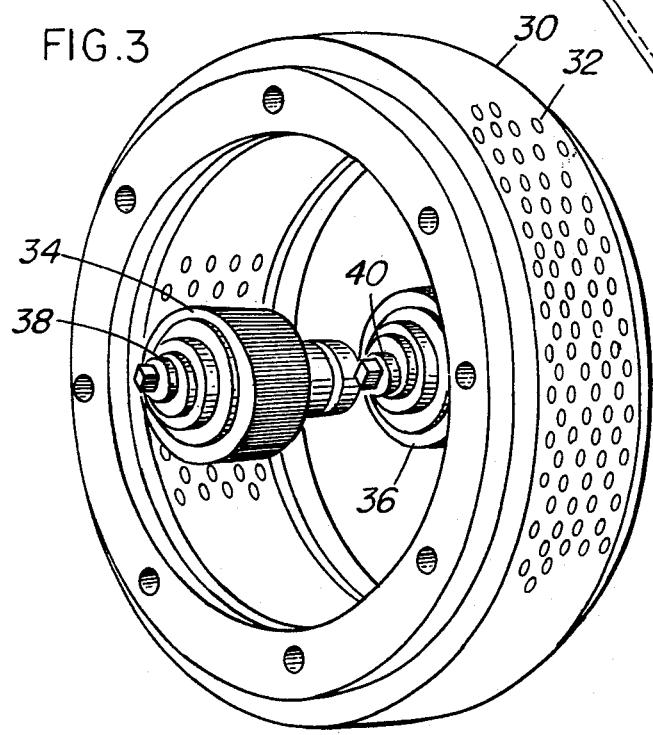

APPARATUS FOR PELLETIZING PLASTIC MATERIAL

This is a division of application Ser. No. 615,948, filed Sept. 23, 1975, now U.S. Pat. No. 4,000,232.

BACKGROUND OF THE INVENTION

The present invention relates to pelletizing plastic material. More particularly, the present invention relates to pelletizing plastic material in a system including means for compacting the plastic material through orifices.

It is known to pelletize plastic material by use of a system including means for compacting the plastic material through a plurality of orifices and means for cutting the compacted plastic material into predetermined lengths as the compacted material exits the orifices. As plastic material in a particulate state is compacted through the orifices, it is compressed, adhered to and blocked together. However, heat is generated while compacting the plastic particulate material and such heat may reach a sufficiently high level to melt the plastic material. Plastic material in a molten or semi-molten state may cause a sufficiently severe agglomeration which will bind the parts of the compacting means to cause a shutdown of the pelletizing system.

Binding of the compacting means as a result of plastic agglomeration may require replacement of parts of the compacting means in addition to cleaning the agglomerated plastic mass from the compacting means.

SUMMARY OF THE INVENTION

The present invention provides a system for and a method of pelletizing plastic material wherein heat is maintained below a predetermined temperature in the compacting means to avoid plastic agglomeration which may bind or tend to bind the compacting means.

In accordance with an aspect of the present invention there is provided a system for pelletizing plastic material comprising means for compacting the plastic material through a plurality of orifices, conduit means for venting air from the compacting means, and means for supplying a pressurized gaseous stream in the conduit means in a direction away from the compacting means. The system further comprises means for generating a signal indicative of the temperature of a portion of the compacting means, and means responsive to the signal generating means for controlling the flow rate of the gaseous stream.

In accordance with another aspect of the present invention, there is provided a method of pelletizing loosely divided particulate plastic material in a system including means for compacting the plastic material through a plurality of orifices. The method comprises venting air from the compacting means through a conduit opened to the atmosphere, and supplying a pressurized gaseous stream in the conduit in a direction away from the compacting means. The method further comprises generating a signal indicative of the temperature of a portion of the compacting means, and controlling the flow rate of the gaseous stream in response to the signal to prevent the temperature of the compacting means from reaching a level at which the plastic material tends to agglomerate.

BRIEF DESCRIPTION OF THE DRAWINGS

FIG. 1 is a front elevational view of a pelletizing system incorporating an embodiment of the present invention;

FIG. 2 is a side elevational view of the pelletizing system shown in FIG. 1;

FIG. 3 is a perspective view of a die and roller device for compacting plastic material in the pelletizing system of the FIG. 1;

FIG. 4 is a side elevational view of an air duct mounted on the front of the pelletizing system shown in FIG. 1; and FIG. 5 shows a system for supplying air to the air duct of FIG. 4 and a circuit for controlling the flow of air.

DESCRIPTION OF SPECIFIC EMBODIMENTS

In a specific embodiment of the present invention, scrap plastic from a plastic film manufacturing process is ground into particulate plastic material in a grinder (not shown), for example model No. 50510-6914 manufactured by Cumberland Company, Providence, Rhode Island. The particulate plastic material is flake-like and is fed by a blower (not shown) through a conveying pipe (not shown) to a cyclone (not shown) wherein the particulate plastic material is separated from the conveying air and permitted to fall by gravity into an opened-top hopper 1 of a pelletizing system shown in FIGS. 1 and 2. The pelletizing system shown in FIGS. 1 and 2 is Pellet Ace type 501G manufactured by Sprout, Waldron & Co., Muncy, Pennsylvania. The hopper 1 has a pair of inspection windows 2 and an inspection door 3. The hopper 1 guides the particulate plastic material into the top of a device 4 for metering the flow of particulate plastic material. The metering device 4 includes an auger 5 powered by a variable speed motor 6. The particulate plastic falls from an opened bottom end 7 of the metering device 4 into a chute 8 which feeds a compacting section 10.

The pelletizing system also includes a drive section 12 having a plurality of belts 14 extending between a rotatably mounted grooved sheave 16 and a smaller diametered grooved sheave 18 mounted on a drive shaft 20 of a motor 22. As shown in FIG. 3, the compacting section 10 has a cylindrical die 30 with a plurality of orifices in the form of perforations 32 extending radially through the die 30 about the whole periphery of the die 30. To simplify the drawing, FIG. 3 shows the perforations 32 only on portions of the die 30. The die 30 is rigidly secured to the sheave 16, and is rotated in unison with the sheave 16 by the motor 22 and the belts 14. A pair of idler rollers 34, 36 are mounted within the die 30. The rollers 34, 36 are spaced apart and in close proximity to the inner surface of the die 30. The rollers 34, 36 are rotatably about pinions 38, 40 which are parallel to the central axis of the die 30. Particulate plastic material is fed in a loosely divided state inside of the die 30 from the chute 8, and rotation of the die 30 acts to cause the particulate plastic material to be compacted against the inner surface of the die 30 by the idler rollers 34, 36 and forced through the perforations 32.

The compacted plastic material exits the perforations 32 in a rod-like form and a knife 42 cuts the rod-like plastic material into pellets of suitable length, for example, ¼ diameter × ⅜ inch length. A back-up knife 44 is shown in the drawings, and is used in the event the first knife 42 wears and requires sharpening. Each knife 42, 44 has a manually operable worm gear handle 46 for adjusting the position of the cutting edge (not shown) of the knife with respect to peripheral surface of the die 30. Plastic pellets fall through an opening 48 in the bottom of compacting device 16, and are collected for use in process operations for making plastic materials.

The motor 22 is mounted on a vertical plate 50. The vertical plate 50 is supported by an arm 52 secured at the lower end thereof to a base 54 of the pelletizing system. Another support arm 54 is connected between the plate 50 and a shaft support member 56 extending upwardly from base 54. The support member 56 supports the rotatable shaft of the sheave 16 to which the die 30 is rigidly secured.

Heat is generated from friction caused by compacting the particulate plastic material between the die 30 and the idler rollers 34, 36. For any particular plastic, it is necessary to have the particulate plastic heated to a temperature sufficient to promote blocking and adherence of the particulate plastic material during the compacting step, but to a sufficiently low temperature to avoid molten or semi-molten states. For example, low density or medium density polyethylene will have approximately 90% melted material at about 105° C. High density polyethylene will be in an approximate 90% melt state at 125° C. If the polyethylene is highly molten, it will agglomerate in the compacting device 10 between the die 30 and the idler rollers 34, 36 and tend to bind the die 30 and the idler rollers 34, 36. To avoid agglomeration of polyethylene, and to provide a sufficient heat for promoting blocking and adherence of the particulate material, it is preferable to have the temperature of low and medium density polyethylene in the compacting device at about 85° C, and to have the temperature of high density polyethylene at about 105° C. At these temperatures, 90% of the polyethylene will not be melted. Similiarly polypropylene has a melting range of about 160° C. to 165° C. To avoid agglomeration of polypropylene in the compacting device 10, it is preferable to have particulate polypropylene at a temperature of about 140° C.

The present invention provides for maintaining heat in the compacting device below a predetermined temperature which will vary according to the type of plastic being pelletized, but at a temperature sufficient to promote blocking and adherence of the particulate plastic material.

With reference to FIG. 4, an outwardly and upwardly extending duct 50 is secured to a pivotally mounted access door 52 on the front end of the compacting device 10. The duct 50 has a damper 54 at an upper end thereof which is manually operable by a handle 56 of a pivotal pin 58 extending through the duct 50. The damper 54 is opened when practicing the present invention. A screen 60 is mounted on an upper open end 62 of the duct 50. A thermocouple 64 is inserted at the lower end of the duct 50 in close proximity to an opening 66 in the access door 52 for sensing the temperature of the air entering the duct 50 through the opening 66. A nozzle 70 is inserted in the duct 50, and is pointed in an upward direction away from the opening 66 for feeding a gaseous stream such as compressed air into the duct toward the opening 62. The thermocouple 64 is connected by an electrical lead to a comparator circuit 67 shown in FIG. 5. The nozzle 70 is connected by an air line 72 to a source of compressed air also shown in FIG. 5.

With reference to FIG. 5, in one embodiment of the present invention compressed air is feed from a compressor 74 through an air line 75 having a pressure regulator valve 76 therein to supply an air stream of a predetermined pressure of, for example, 10 psig to the air line 72. The pressurized air stream in the duct 50 acts to draw cooling air from a gap 85 (FIG. 1) between the metering device 4 and the opened-top end of the chute 8 through the compacting section 10 to the opening 66.

The comparator circuit 67 has a set point adjustor 78 for supplying a signal indicative of a predetermined temperature. When the thermocouple 64 generates a signal indicative of temperature equal to or in excess of the set point temperature, the comparator circuit 67 supplies an actuating signal by an output line 79 to a solenoid 80 of a solenoid operable valve 81 to open the valve 81. When valve 81 is opened an additional compressed air stream is supplied by air line 82 through the valve 81 to the air line 72 at a relatively high pressure, for example 70 to 90 psig.

The additional compressed air stream supplied by the air line 82 to the nozzle 70 acts to increase the amount of cooling air drawn through the gap 85 between the metering device 4 and the opened-top end of the chute 8 to reduce the temperature of the plastic material in the compacting device 10 and the air sensed by the thermocouple 64. When the temperature of air sensed by thermocouple 64 is decreased below the predetermined temperature determined by the set point adjustor 78, the comparator circuit 67 removes the actuating signal from the output line 78 to thereby de-energize the solenoid 80 and close the valve 81.

Alternatively, the comparator circuit 67 can supply an output signal whenever the temperature sensed by thermocouple 64 is below the set point (predetermined) temperature to energize the solenoid 80 now connected in a mode to maintain valve 81 in a closed position when energized. When the temperature sensed by the thermocouple is at or above the predetermined temperature, the solenoid 80 is de-energized to open the valve 81. In this embodiment, should the comparator circuit 67 fail the solenoid is automatically de-energized to open the valve 81 and insure a supply of pressurized air through the air line 82 to thus prevent the temperature of the plastic material in the compacting device 10 from reaching a level in which the material may agglomerate. A device suitable for this alternative embodiment is a Control Meter Relay, Model No. 921008 manufactured by Beede Electrical Instrument Co., Inc., Penacook, New Hampshire.

In another alternative embodiment, the plastic material being pelletized may not require the constant relatively low pressure air stream provided by air line 75 to the nozzle 70 to maintain a suitable temperature in the compacting device 10. In this embodiment, the valve 76 is maintained in a closed position and the valve 81 is opened only when the thermocouple 64 senses a temperature at or above the set point or predetermined temperature to supply the relatively high pressure air stream through conduit 82 to the nozzle 70.

In a further embodiment, the valve 81 can be adjustable to a plurality of positions and controlled by the output signal of comparator circuit 65 to regulate the pressure of the air stream supplied by the air line 82 to the nozzle 70 to maintain a predetermined temperature at the outlet 66 of the compacting device 10.

The temperature of the air sensed by the thermocouple 64 is indicative of the temperature of the portion of the compacting means inside of the outlet 66 and also of the temperature of the plastic material being compacted. It is apparent that the thermocouple can be inserted into the compacting device 10 to provide a direct reading of the temperature therein.

The predetermined temperature applied to the comparator circuit 67 by the set point adjustor 78 will depend upon the location of the thermocouple 64, and the type of plastic material in the compacting means 10. The set point or predetermined temperature can be empirically determined, or if the thermocouple 64 is in close proximity to the plastic in the compacting device, the predetermined temperature can be that temperature at which blocking and adherence is promoted and agglomeration is avoided.

In accordance with another embodiment of the present invention, the nozzle 70 can be vertically adjustable in the duct 50 to control the amount of cooling air drawn through the compacting means 10. The baffle 54 can also be manipulated to control the flow rate of the air stream in the duct 50.

The pelletizing system and method described hereinabove is particularly suited for thermoplastic materials such as polyolefins, for example polyethylene, polypropylene and polybutene, and other thermoplastics such as polystyrene, polyethylene terphthalate, polyvinyl chloride, polyvinyl acetate, copolymers thereof, and the like.

We claim:

1. In a system for pelletizing plastic material comprising means for compacting the plastic material through a plurality of orifices, the improvement comprising:
   conduit means for venting air from said compacting means,
   means for supplying a pressurized gaseous stream in said conduit means in a direction away from said compacting means,
   means for generating a signal indicative of the temperature of a portion of said compacting means, and
   means responsive to said signal generating means for controlling the flow rate of said gaseous stream.

2. The system of claim 1 wherein said supplying means supplies said gaseous stream at a first pressure when the temperature of said portion of said compacting means is below a predetermined value, and wherein said supplying means supplies, in response to said controlling means, said gaseous stream at a second pressure higher than said first pressure when the temperature of said portion of said compacting means is at or above said predetermined value.

3. The system of claim 2 wherein said gaseous stream is compressed air.

4. The system of claim 3 wherein said first pressure is about 10 psig, and said second pressure is about 70 psig to about 90 psig.

5. The system of claim 1 wherein said supplying means is inactive when the temperature of said portion of said compacting means is below a predetermined value, and wherein said supplying means supplies said gaseous stream, in response to said controlling means, when the temperature of said portion of said compacting means is at or above said predetermined value.

6. The system of claim 1 wherein the plastic material is in a loosely divided particulate state prior to entering said compacting means.

7. The system of claim 6 wherein said compacting means comprises:
   a housing,
   a cylindrical die within said housing, said die being rotatable about a central longitudinal axis, and said orifices being radially formed perforations in said die,
   a plurality of idler rollers within said die, each one of said rollers being rotatable about a central longitudinal axis, and, each one of the roller axes being parallel to the axis of said die, and
   means for rotating said die, whereby said rollers compact the loosely divided particulate plastic material and force the compacted particulate material through said perforations; and
   wherein the pelletizing system further comprises means for cutting the compacted plastic material exiting said perforations into pellets of predetermined length.

8. The system of claim 7 further comprising means for metering the flow rate of the loosely divided particulate plastic material to said compacting means.

9. The system of claim 8 wherein said metering means is an auger.

10. The system of claim 7 wherein said conduit means is connected to said housing.

11. The system of claim 10 wherein said conduit means extends upwardly.

12. The system of claim 11 wherein said conduit means comprises a pivotally mounted damper for adjusting the flow rates of air vented from said housing and of said gaseous stream.

13. The system of claim 12 wherein said conduit means is opened to the atmosphere downstream of said damper means.

14. The system of claim 11 wherein said gaseous stream is compressed air, and wherein said supplying means comprises a source of compressed air, a nozzle extending into said conduit means, and a feed line interconnecting said compressed air source and said nozzle.

* * * * *